United States Patent [19]

Nagashima

[11] Patent Number: 4,755,488
[45] Date of Patent: Jul. 5, 1988

[54] GLASS-CERAMIC ARTICLE

[75] Inventor: Yukihito Nagashima, Hyogo, Japan

[73] Assignee: Nippon Sheet Glass Co., Ltd., Osaka, Japan

[21] Appl. No.: 791,158

[22] Filed: Oct. 22, 1985

[30] Foreign Application Priority Data

Oct. 23, 1984 [JP] Japan .................. 59-222341

[51] Int. Cl.$^4$ .................. C03C 10/12; C03C 10/14
[52] U.S. Cl. .................. 501/4; 501/7
[58] Field of Search .................. 501/7, 4; 65/30.13, 65/30.14

[56] References Cited

U.S. PATENT DOCUMENTS 3,507,737 4/1970 Basdiecker et al. .................. 501/32

FOREIGN PATENT DOCUMENTS 47-1318 1/1972 Japan .................. 501/4

OTHER PUBLICATIONS

Hlavac, J; "The Technology of Glass and Ceramics, An Introduction" Elsevier Scientific Publishing Corp., Amsterdam, Oxford & New York 1983 pp. 175–176.

*Primary Examiner*—Mark L. Bell
*Attorney, Agent, or Firm*—Wenderoth, Lind & Ponack

[57] ABSTRACT

A transparent glass-ceramic article of a unitary structure composed of an interior portion and an exterior portion, wherein the interior portion containing a crystalline phase comprises (a) 55 to 75% by weight of $SiO_2$,
(b) 15 to 30% by weight $Al_2O_3$,
(c) 2 to 6% by weight of $Li_2O$
(d) 1 to 5% by weight of $Na_2O$, and
(e) 2 to 9% by weight of $TiO_2+ZrO_2P_2O_5$, the total amount of the components (a) to (e) being 95 to 100 by weight, and wherein the exterior portion has the same glass composition as the interior portion but at least a part of $Na_+$ in the exterior portion is exhanged with $K_+$.

8 Claims, No Drawings

GLASS-CERAMIC ARTICLE

BACKGROUND OF THE INVENTION

1. Field of the Invention

This invention relates to a transparent glass-ceramic article having high hardness and mechanical strength.

2. Description of the Prior Art

A transparent article used in cover glasses of watches and the like is required to have high hardness, mechanical strength and transparency. From the viewpoint of transparency, materials used for such an article are limited to plastics, glass and transparent crystalline materials such as sapphire. The plastics and glass lack hardness. The transparent crystalline materials lack strength or require time and labor for molding and processing, and the cost of production becomes very high. For this reason, chemically strengthened glass is used in general-grade articles at the sacrifice of hardness, and in some luxurious articles, sapphire single crystal is used at the sacrifice of cost.

Chemical strengthening of glass-ceramic by ion exchange has been proposed in Japanese Patent Publication No. 49299/1972 (corresponding to U.S. Ser. Nos. 365035, 365117, 365177, 365178, 365198, 365199, 365201 and 365202). In some of the glass-ceramic articles desribed in the prior art, no consideration is given to their transparency. Or some of them require high treating temperatures in order to exchange $Li^+$ in the glass-ceramic with $Na^+$ or $K^+$, and therefore, nitrates such as potassium nitrate having a relatively low heat decomposition temperature cannot be used as a salt bath. Strength cannot be improved unless a salt bath of a sulfate or chloride which has a high heat-decomposition temperature but is strongly corrosive is used. In articles whose transparency is important as in cover glasses for watches, the use of a strongly corrosive molten salt (such as KCl, $K_2SO_4$, NaCl or $Na_2SO_4$) is not desirable. The ion exchange treatment will corrode the surface layer and reduce its transparency, and if the surface layer is polished in order to obtain transparency, the resulting surface compressive stress layer will be removed and the strength of glass decreases to that before the ion exchange.

SUMMARY OF THE INVENTION

It is an object of this invention to provide a transparent glass-ceramic article having high hardness by crystallization treatment. The high strength is obtained by ion exchange in a molten bath of a salt having a relatively low tendency to cause corrosion, such as $KNO_3$.

According to this invention, there is provided a transparent glass-ceramic article of a unitary structure composed of an interior portion and an exterior portion, wherein the interior portion containing a crystalline phase comprises (a) 55 to 75% by weight, preferably 60 to 72% by weight, most preferably 64 to 68% by weight, of $SiO_2$, (b) 15 to 30% by weight, preferably 18 to 26% by weight, most preferably 21 to 24% by weight, of $Al_2O_3$, (c) 2 to 6% by weight, preferably 3 to 5% by weight, most preferably 3.5 to 5% by weight, of $Li_2O$, (d) 1 to 5% by weight, preferably 1 to 3% by weight, most preferably 1.2 to 2.5% by weight, of $Na_2O$, and (e) 2 to 9% by weight, preferably 3.5 to 9% by weight, and most preferably 3.5 to 7.5% by weight, of $TiO_2 + ZrO_2 + P_2O_5$, the total amount of the components (a) to (e) being 95 to 100 by weight, and wherein the exterior portion has the same glass composition as the interior portion but at least a part of $Na^+$ in the exterior portion is exchanged with $K^+$.

A preferred combination of the three components in (e) above is 0–7.5% by weight $TiO_2$, 0–7.5% by weight $ZrO_2$ and 0–5% by weight $P_2O_5$. A more preferred combination is 1.5–5% by weight $TiO_2$, 1.5–5% by weight $ZrO_2$ and 0–5% by weight $P_2O_5$. The most preferred combination is 1.5–5% by weight $TiO_2$, 1.5–3.5% by weight $ZrO_2$ and 0–3% by weight $P_2O_5$.

The crystalline phase of the glass-ceramic article of this invention is a beta-quartz solid solution or beta-spodumene, preferably the beta-quartz solid solution.

DETAILED DESCRIPTION OF THE INVENTION $SiO_2$ is a component which forms the network structure of glass and by crystallization treatment, forms a crystalline phase together with $Al_2O_3$ and $Li_2O$. If its proportion is less than 55%, the chemical durability of the crystallized glass is reduced. If it exceeds 75%, it is difficult to melt and mold glass.

$Al_2O_3$ forms a crystalline phase together with $SiO_2$ and $Li_2O$. If its proportion is less than 15%, the glass is difficult to crystallize, and if it exceeds 30%, the melting and molding of the glass become difficult.

$Li_2O$ acts as a flux for glass melting, and also forms a crystalline phase together with $SiO_2$ and $Al_2O_3$. If its proportion is less than 2%, the meltabilty of glass is reduced, and crystals are difficult to form. If it exceeds 6%, the crystal particles become coarse, and the transparency of the crystallized glass is reduced.

$Na_2O$ serves to improve the meltability of glass, and plays a main role in improving the strength of glass by ion exchange with $K^+$ in the molten salt in the surface layer of the crystallized glass. If its proportion is less than 1%, the effect of strengthening by ion exchange is small. If it exceeds 5%, the crystal particles become coarse, and the difference of refractive index between the crystals and the matrix glass phase increases so that the transparency of the crystallized glass is reduced.

$TiO_2$, $ZrO_2$ and $P_2O_5$ are components which promote crystallization by becoming crystal nuclei or promoting formation of crystal nuclei in the process of crystallization of glass. If the total proportion of these components is less than 2%, the number of crystal nuclei is insufficient, and the glass becomes difficult to crystallize; or the crystal particles become coarse and the transparency of the crystallized glass is reduced. If it exceeds 9%, the crystals of these components themselves grow, and the difference of their refractive index from that of the $Li_2O-Al_2O_3-SiO_2$ crystals or the matrix glass phase reduces the transparency of the crystallized glass. $TiO_2$ and $ZrO_2$, even when added singly, give a sufficient effect as a crystallization promoter, but a better effect can be obtained by using them in combination. $P_2O_5$, when used singly, does not give a sufficient effect. But when used in combination with $TiO_2$ and $ZrO_2$, $P_2O_5$ accelerates the action of each of these crystallization promoters. If the proportion of $ZrO_2$ exceeds the upper limit mentioned above, the liquidus temperature of the glass remarkably rises and the glass becomes difficult to melt. If the proportions of these three components exceeds the aforesaid upper limits, they precipitate as crystals upon crystallization, or the refractive index difference between the $Li_2O$-$Al_2O_3$-$SiO_2$ crystals and the matrix glass phase becomes large, and the transparency of the crystallized glass tends to be reduced undesirably.

When at least one of $K_2O$, MgO, CaO, BaO, ZnO, PbO and $B_2O_3$ is added in an amount of up to 5% by weight, the meltability or workability of glass can be improved without an appreciable effect on the properties of the final product. If its amount exceeds 5%, the glass becomes difficult to crystallize or ion exchange is hampered. Furthermore, a refining agent such as $As_2O_3$, $Sb_2O_3$, or $SO_3$ or F or a coloring agent such as $Fe_2O_3$, CoO, Se, or NiO can be added in amounts which do not impair the properties of the final product.

EXAMPLE

Glass having each of the compositions indicated in Table 1 was molded into a round rod having a diameter of 5 mm and a length of 50 mm. The rod was heated to 750° C. at a rate of 5° C./min. and maintained at this temperature for 4 hours. It was further heated to 850° C., and maintained at this temperature for 4 hours to form crystallized glass. The crystallized glass was immersed for 30 hours in a molten $KNO_3$ at 500° C., and the flexural strength and haze of the product were measured. The results are shown in Table 1.

Samples Nos. 5 to 10 are glasses within the composition range specified in this invention. Samples Nos. 1 to 4 are glasses having an $Na_2O$ content of less than 1%.

Table 1 shows that the flexural strength is higher with a higher content of $Na_2O$, and that none of the samples Nos. 1 to 10 were impaired in transparency by crystallization.

hardness of glass can be increased by crystallizing it and further subjecting the crystallized glass to ion exchange. Glass having the composition shown in Sample No. 7 in Table 1 was heated to 750° C. at a rate of 5° C./min. and maintained at this temperature for 8 hours, and subsequently heated to 850° C. and maintained at this temperature for 4 hours. The crystallized glass was then subjected to ion exchange, and its flexural strength and Vickers hardness were measured. The results were as Flexural strength: 4860 kg/cm$^2$
Vickers hardness: 1030

Since 1 to 5% of $Na_2O$ is added to an $Li_2O$-$Al_2O_3$-$SiO_2$ type glass specified in the appended claims containing crystal nucleus-forming components in preparing the starting glass batch for the crystallized glass-ceramic article of this invention, Na$^+$ is easily exchanged with K$^+$ by ion-exchange performed after the crystallization heat-treatment of the starting glass. As a result, high strength such as high flexural strength and high surface hardness can be obtained. The article of this invention also retains excellent transparency without a loss of transparency during the crystallization treatment and the ion-exchange treatment.

What is claimed is:

1. A transparent glass-ceramic article of a unitary structure composed of an interior portion and an exterior portion, wherein the interior portion containing a crystalline phase consisting essentially of
   (a) 55 to 75% by weight of $SiO_2$,
   (b) 15 to 30% by weight $Al_2O_3$,
   (c) 2 to 6% by weight of $Li_2O$,
   (d) 1.2–5% by weight of $Na_2O$, and
   (e) 2 to 9% by weight of $TiO_2+ZrO_2+P_2O_5$, the total amount of the components (a) to (e) being 95 to 100 by weight, and wherein the exterior portion has the

TABLE 1

| Sample No. | 1 | 2 | 3 | 4 | 5 | 6 | 7 | 8 | 9 | 10 |
|---|---|---|---|---|---|---|---|---|---|---|
| Glass composition (% by weight) | | | | | | | | | | |
| $SiO_2$ | 65.5 | 71.0 | 60.5 | 65.2 | 64.3 | 65.0 | 64.7 | 64.3 | 63.8 | 62.3 |
| $Al_2O_3$ | 22.5 | 19.0 | 25.5 | 22.5 | 23.0 | 22.3 | 22.3 | 22.2 | 21.7 | 21.4 |
| $Li_2O$ | 4.5 | 4.0 | 5.0 | 4.5 | 3.5 | 4.5 | 4.5 | 4.5 | 4.5 | 4.3 |
| $Na_2O$ | 0.5 | 0.5 | 0.8 | 0.8 | 1.2 | 1.2 | 1.5 | 2.0 | 3.0 | 5.0 |
| $TiO_2$ | 2.0 | 4.5 | 0 | 2.0 | 3.7 | 2.0 | 2.0 | 2.0 | 2.0 | 2.0 |
| $ZrO_2$ | 2.5 | 0 | 4.5 | 2.5 | 1.5 | 2.5 | 2.5 | 2.5 | 2.5 | 2.5 |
| $P_2O_5$ | 1.5 | 0 | 2.7 | 1.5 | 1.8 | 1.5 | 1.5 | 1.5 | 1.5 | 1.5 |
| $As_2O_3$ | 1.0 | 1.0 | 1.0 | 1.0 | 1.0 | 1.0 | 1.0 | 1.0 | 1.0 | 1.0 |
| Flexural strength (kg/cm$^2$) | 2670 | 2350 | 2890 | 3010 | 4260 | 4530 | 4910 | 5150 | 5620 | 6020 |
| Haze (%) | 0.22 | 0.34 | 0.32 | 0.23 | 0.26 | 0.24 | 0.26 | 0.35 | 0.63 | 0.84 |

The flexural strength and Vickers hardness of the glass of sample No. 7 were measured before and after the above crystallization heat-treatment and the ion exchange treatment. The results are shown in Table 2.

TABLE 2

| Sample | Flexural strength (kg/cm$^2$) | Vickers hardness |
|---|---|---|
| (a) Glass | 750 | 550 |
| (b) Crystallized glass | 1380 | 815 |
| (c) Glass (b) after ion-exchange | 4910 | 940 |
| (d) Glass (a) after ion-exchange | 3580 | 650 |

It is seen from Table 2 that ion-exchange of crystallized glass greatly increases its strength, and that the same glass composition as the interior portion but at least a part of Na$^+$ in the exterior portion is exchanged with K$^+$.

2. The glass-ceramic article of claim 1 wherein the interior portion consisting essentially of (a) 60 to 72% by weight of $SiO_2$, (b) 18 to 26% by weight of $Al_2O_3$, (c) 3 to 5% by weight of $LiO_2$, (d) 1.2 to 3% by weight of $Na_2O$ and (e) 3.5 to 9% by weight of $TiO_2+ZrO_2+P_2O_5$.

3. The glass-ceramic article of claim 2 wherein the interior portion consisting essentially of (a) 64 to 68% by weight of $SiO_2$, (b) 21 to 24% by weight of $Al_2O_3$, (c) 3.5 to 5% by weight of $Li_2O$, (d) 1.2 to 2.5% by weight of $Na_2O$ and (e) 3.5 to 7.5% by weight of $TiO_2+ZrO_2+P_2O_5$.

4. The glass-ceramic article of claim 1 wherein the crystalline phase is a beta-quartz solid solution or beta-spodumene.

5. The glass-ceramic article of claim 1 wherein the crystalline phase is a beta-quartz solid solution.

6. The glass-ceramic article of claim 1 wherein the component (e) is composed of 0 to 7.5% by weight of $TiO_2$, 0 to 7.5% by weight of $ZrO_2$ and 0 to 5% by weight of $P_2O_5$.

7. The glass-ceramic article of claim 6 wherein the component (e) is composed of 1.5 to 5% by weight of $TiO_2$, 1.5 to 5% by weight of $ZrO_2$ and 0 to 5% by weight of $P_2O_5$.

8. The glass-ceramic article of claim 7 wherein the component (e) is composed of 1.5 to 5% by weight of $TiO_2$, 1.5 to 3.5% by weight of $ZrO_2$ and 0 to 3% by weight of $P_2O_5$.

* * * * *